United States Patent
Cho

(10) Patent No.: US 9,736,020 B2
(45) Date of Patent: Aug. 15, 2017

(54) MASTER DEVICE OF PROCESS FIELD BUS DECENTRALIZED PERIPHERY

(71) Applicant: LSIS CO., LTD., Anyang-si, Gyeonggi-do (KR)

(72) Inventor: Duk Yun Cho, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 11 days.

(21) Appl. No.: 14/264,908

(22) Filed: Apr. 29, 2014

(65) Prior Publication Data

US 2014/0337455 A1    Nov. 13, 2014

(30) Foreign Application Priority Data

May 13, 2013    (KR) .................. 10-2013-0053594

(51) Int. Cl.
*G06F 15/16* (2006.01)
*H04L 12/24* (2006.01)
(Continued)

(52) U.S. Cl.
CPC ...... *H04L 41/0816* (2013.01); *G05B 19/0421* (2013.01); *H04L 12/40019* (2013.01);
(Continued)

(58) Field of Classification Search
CPC ............. H04L 12/40221; G05B 2219/25014
See application file for complete search history.

(56) References Cited

U.S. PATENT DOCUMENTS 6,098,116 A * 8/2000 Nixon .................. G06F 13/20
709/220

6,449,715 B1 * 9/2002 Krivoshein ........ G05B 19/4185
700/1
(Continued)

FOREIGN PATENT DOCUMENTS

CN    101753486    6/2010
JP    2000-163177    6/2000

OTHER PUBLICATIONS

Japan Patent Office Application Serial No. 2014-098311, Office Action dated Jan. 16, 2015, 2 pages.
(Continued)

*Primary Examiner* — Umar Cheema
*Assistant Examiner* — Tesfu Mekonen
(74) *Attorney, Agent, or Firm* — Lee, Hong, Degerman, Kang & Waimey

(57) ABSTRACT

The master device of Profibus DP according to the present disclosure automatically configures network by performing a communication with a plurality of slave devices connected through Profibus, the device including a Profibus communication module configured to perform a communication with a plurality of slave devices, an imaginary network configuration information storage configured to be stored in advance with imaginary network configuration information, a network configuration information storage configured to be stored with network configuration information, and a Profibus master state machine configured to obtain network configuration information by performing a communication with the plurality of slave devices in response to the imaginary network configuration information stored in the imaginary network configuration information storage, to store the obtained network configuration information in the network configuration information storage, and to perform a communication with the plurality of slave devices in response to the stored network configuration information.

3 Claims, 4 Drawing Sheets

(51) Int. Cl.
*G05B 19/042* (2006.01)
*H04L 12/40* (2006.01)
(52) U.S. Cl.
CPC .................. *H04L 12/40078* (2013.01); *G05B 2219/15012* (2013.01); *G05B 2219/2231* (2013.01); *G05B 2219/25021* (2013.01); *G05B 2219/33112* (2013.01); *H04L 2012/40221* (2013.01)

(56) References Cited

U.S. PATENT DOCUMENTS

| | | | |
|---|---|---|---|
| 8,886,786 B2* | 11/2014 | Hahniche | G05B 19/4184 |
| | | | 700/79 |
| 2005/0270063 A1 | 12/2005 | Cornett | |
| 2008/0123522 A1* | 5/2008 | Elliott | H04L 12/40202 |
| | | | 370/220 |
| 2010/0064297 A1* | 3/2010 | Doll | G06F 9/54 |
| | | | 719/315 |
| 2013/0254443 A1* | 9/2013 | Sixt | G06F 13/4295 |
| | | | 710/110 |
| 2014/0337551 A1* | 11/2014 | Cho | G06F 13/4282 |
| | | | 710/110 |

OTHER PUBLICATIONS

European Patent Office Application Serial No. 14167205.5, Search Report dated Oct. 12, 2015, 6 pages.
State Intellectual Property Office of the People's Republic of China Application Serial No. 201410200900.0, Office Action dated Jan. 22, 2017, 6 pages.

* cited by examiner

MASTER DEVICE OF PROCESS FIELD BUS DECENTRALIZED PERIPHERY

Pursuant to 35 U.S.C. §119 (a), this application claims the benefit of earlier filing date and right of priority to Korean Patent Application No. 10-2013-0053594, filed on May 13, 2013, the contents of which are hereby incorporated by reference in their entirety.

BACKGROUND OF THE INVENTION

Field of the Invention

The present disclosure relates to a master device of Profibus DP (Process Field Bus Decentralized Periphery) configured to allow automatically setting a network by performing communication with a plurality of slave devices connected through a Profibus network.

Description of Related Art

Generally, Profibus is one of names of a family of industrial network communication protocols used for real-time distributed control, now standardized as IEC (International Electro-technical Commission) 61158, and used for real time communication among field devices in various industrial fields including manufacturing fields, process control fields and building automation fields.

The Profibus is classified, based on applicable fields, into FMS (Field Message Specification), Profibus DP (Decentralized Periphery) and Profibus PA (Process Automation), and Profibus DP is widely used for factory automation fields.

A network of Profibus DP includes a master and a plurality of slave devices for input and output of data, and communication between the master and the plurality of slave devices is performed through network configuration information stored in the master of the Profibus DP. The network configuration information includes communication speed information of the plurality of slave devices to communicate with the master of Profibus DP and input/output information.

SUMMARY OF THE INVENTION

The present disclosure is directed to provide a master device of Profibus DP (Process Field Bus Decentralized Periphery) configured to allow automatically setting a network by performing a communication with a plurality of slave devices connected through a Profibus network.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a master device of Profibus DP, the master device comprising:
a Profibus communication module configured to perform a communication with a plurality of slave devices;
an imaginary network configuration information storage configured to be stored in advance with imaginary network configuration information;
a network configuration information storage configured to be stored with network configuration information; and
a Profibus master state machine configured to obtain network configuration information by performing a communication with the plurality of slave devices based on the imaginary network configuration information stored in the imaginary network configuration information storage, to store the obtained network configuration information in the network configuration information storage, and to perform a communication with the plurality of slave devices based on the stored network configuration information.

Preferably, but not necessarily, the master device may further comprise a slave information collector configured to request network configuration information of the plurality of slave devices from the Profibus master state machine, and to collect the requested network configuration information of the plurality of slave devices, wherein the Profibus master state machine may obtain the network configuration information by performing a communication with the plurality of slave devices, when there is a information collection request from the slave information collector, to allow the slave information collector to collect the obtained network configuration information by being provided with the obtained network configuration information, and to store the network configuration information collected by the slave information collector in the network configuration information storage.

Preferably, but not necessarily, the slave information collector may determine whether the network configuration information is stored in the network configuration information storage, and requests the network configuration information of the plurality of slave devices from the Profibus master state machine when the network configuration information is not stored in the network configuration information storage.

Preferably, but not necessarily, the master device may further comprise a configuration tool communication module configured to perform a communication with a configuration tool, wherein
the slave information collector may request the Profibus master state machine the network configuration information of the plurality of slave devices when a network auto configuration command is inputted from the configuration tool communication module.

Preferably, but not necessarily, the Profibus master state machine may transmit a diagnosis message to the plurality of slave devices based on the imaginary network configuration information stored in the imaginary network configuration information storage to receive a response message, and transmit a configuration information request message to the plurality of slave devices transmitting the response message to receive network configuration information.

In an advantageous effect, the master device of Profibus DP according to the present disclosure performs a communication with a plurality of slave devices to collect information on the plurality of slave devices, and to configure a network by using the collected information, whereby user convenience can be enhanced and user safety can be secured without the need of checking the slave devices installed at a dangerous place, and whereby configuration of installed network can be automatically ascertained to enable check of uninstalled slave devices to the advantage of maintenance and repair.

BRIEF DESCRIPTION OF THE DRAWINGS

Now, the non-limiting exemplary embodiments of the present disclosure will be described in detail with reference to the accompanying drawings, where like reference numerals designate like elements throughout the specification.

DETAILED DESCRIPTION OF THE INVENTION

The following detailed description of the embodiments of the present disclosure is not intended to limit the scope of the disclosure, as claimed, but is merely representative of possible embodiments of the disclosure. Consequently, the embodiments described herein are further intended to explain modes known of practicing the invention and to enable others skilled in the art to utilize the invention in such, or other embodiments and with various modifications required by the particular application(s) or use(s) of the present disclosure.

Figure 1:
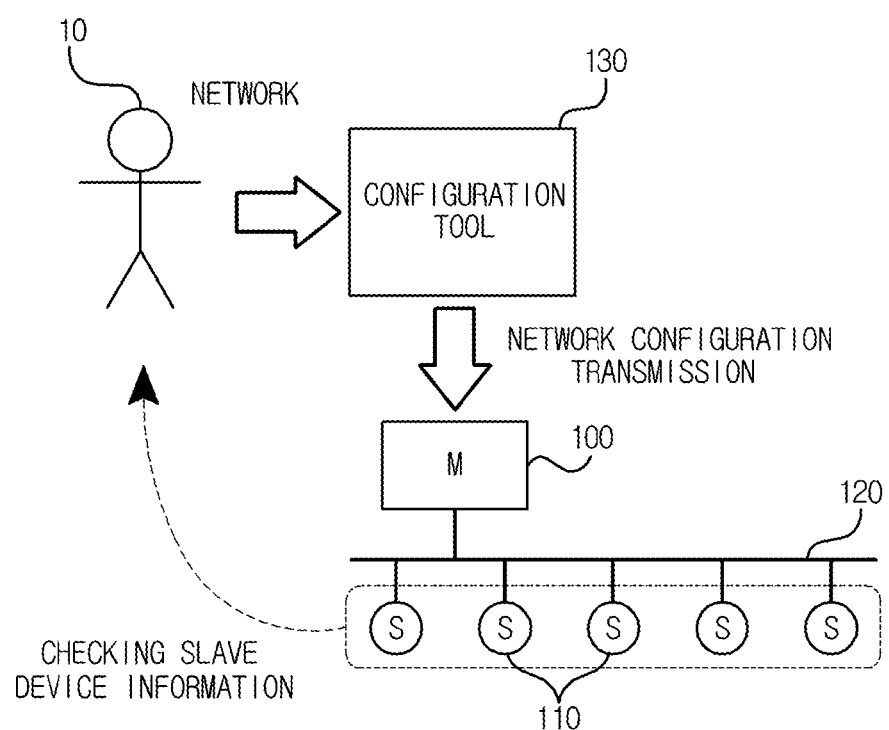
FIG. 1 is a schematic view illustrating a network configuration concept according to prior art.

FIG. 1 is a schematic view illustrating a network configuration concept according to prior art, where reference numeral 100 is a master device, 110 is a plurality of slave devices. The master device (100) and the plurality of slave devices are connected via Profibus (120) to enable a mutual transmission of a predetermined data. Reference numeral 130 is a configuration tool, where the configuration tool (130) performs a network configuration operation of the master device (100).

Figure 2:
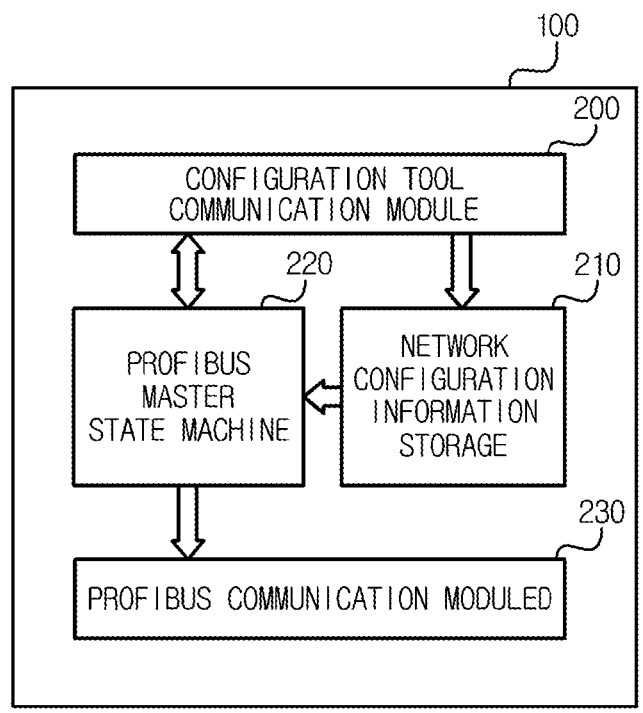
FIG. 2 is a block diagram illustrating a configuration of master device according to prior art.

FIG. 2 is a block diagram illustrating a configuration of a master device according to prior art.

Referring to FIG. 2, the master device (100) may include a configuration tool communication module (200), network configuration information storage (210), a Profibus master state machine (220) and a Profibus communication module (230). The configuration tool communication module (200) receives network configuration information by communicating with the configuration tool (130). The network configuration information storage (210) stores the network configuration information received by the configuration tool communication module (200). The Profibus master state machine (220) performs a mutual communication with the plurality of slave devices (110) through the Profibus (120) using the network configuration information stored in the network configuration information storage (210). The Profibus communication module (230) is connected to the Profibus (120) to interface the data transmitted by the Profibus master state machine (220) and the plurality of slave devices (110).

Figure 3:
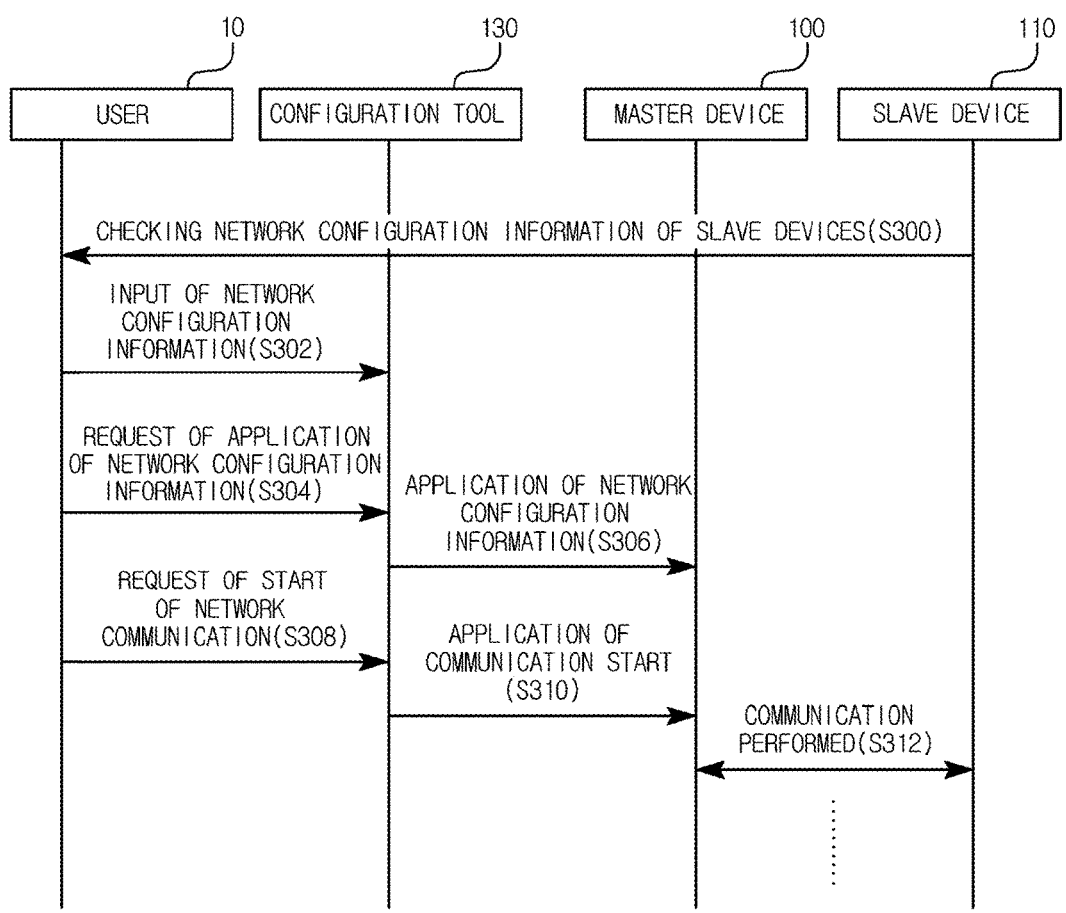
FIG. 3 is a schematic view illustrating a sequence of network configuration operation according to prior art.

FIG. 3 is a schematic view illustrating a sequence of network configuration operation according to prior art.

Referring to FIG. 3, in order to configure a network of the Profibus DP, a user (10) first checks network configuration information of the plurality of slave devices (110) (S200). For example, the user checks the network configuration information such as addresses of the plurality of slave devices (110), communication speed information and input/output data information. At this time, depending on circumstances, the user (10) may personally move to an installation place of the plurality of slave devices (110) to check the network configuration information.

Furthermore, the user (10) inputs the network configuration information to the configuration tool (130) (S302), and when input of the network configuration information is finished, the user (10) requests application of the inputted network configuration information (S304). Then, the configuration tool (130) applies by transmitting the network configuration information to the master device (100) (S306). The network configuration information transmitted by the configuration tool (130) is received by the configuration tool communication module (200) of the master device (100) and is stored in the network configuration information storage (210). Under this state, the user (10) requests the configuration tool (130) start of network communication (S308). Then, the configuration tool (130) requests the master device (100) the application of start of the communication (S310), and in response to the application request of the communication start, the master device (100) performs a communication with the plurality of slave devices (110) through the Profibus (120) based on the network configuration information (S312).

That is, an application request signal of the communication start is received by the configuration tool communication module (200) of the master device (100) and is provided to the Profibus master state machine (220). The Profibus master state machine (220) checks the network configuration information stored in the network configuration information storage (210) in response to the application request signal of the communication start, and performs a communication with the plurality of slave devices (110) through the Profibus communication module (230) and the Profibus (120) in response to the checked network configuration information.

The network configuration according to the prior art is such that a user checks the network configuration information in advance relative to each of the plurality of slave devices and inputs the network configuration information relative to each of the plurality of slave devices through the configuration tool. Thus, the user has the cumbersomeness of checking in advance the network configuration information relative to each of the plurality of slave devices. As a result, the user personally go to a place where each of the plurality of slave devices is installed, whereby the user is exposed to danger in case the user has to check the network configuration information of the plurality of slave devices installed at a dangerous place. Furthermore, the user has to personally input the checked network configuration information of the plurality of slave devices to disadvantageously generate an error by erroneously input in the course of inputting the network configuration information.

Figure 4:
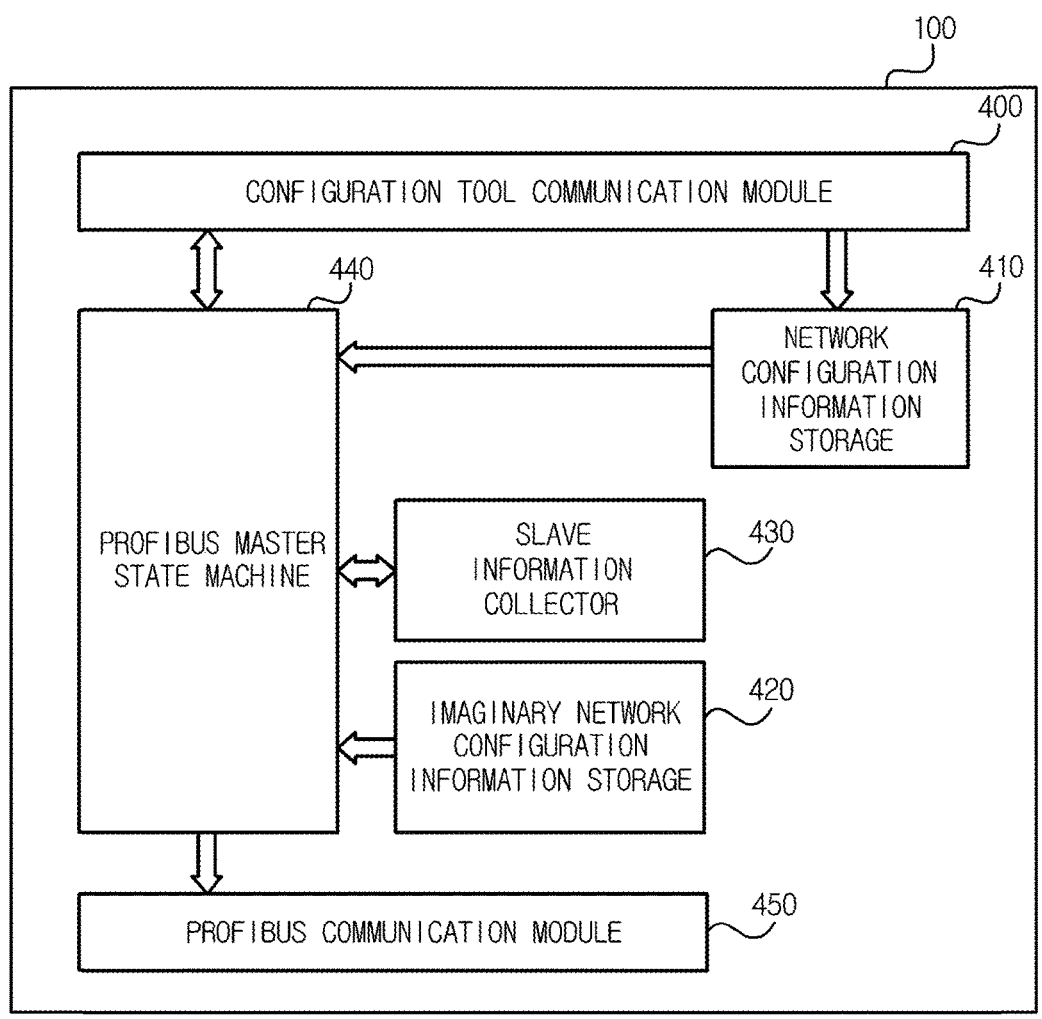
FIG. 4 is a block diagram illustrating a configuration of master device according to the present disclosure.

FIG. 4 is a block diagram illustrating a configuration of master device according to the present disclosure.

Referring to FIG. 4, the master device (100) according to the present disclosure may include a configuration tool communication module (400), network configuration information storage (410), imaginary network configuration information storage (420), a slave information collector (430), a Profibus master state machine (440) and a Profibus communication module (450).

The configuration tool communication module (400) receives an automatic configuration command by performing a communication with the tool configuration. The network configuration information storage (410) stores network configuration information for performing a communication with the plurality of slave devices. The imaginary network configuration information storage (420) is stored with imaginary network configuration information in advance for performing a communication with the plurality of slave devices, when the network configuration information storage (410) is not stored with the network configuration information.

The slave information collector (430) collects information for generating the network configuration information from the plurality of slave devices, when the network configuration information storage (410) is not stored with the network configuration information or when the network automatic configuration command is inputted.

The Profibus master state machine (440) receives the information of the plurality of slave devices by communicating with the plurality of slave devices in response to the imaginary network configuration information stored in the imaginary network configuration information storage (420) when the slave information collector (430) requests the information collection from the plurality of slave devices, allows the slave information collector (430) to collect the received information of the plurality of slave devices, and stores the information collected by the slave information collector (430) in the network configuration information storage as network configuration information. Furthermore, the Profibus master state machine (440) performs a communication with the plurality of slave devices by applying the network configuration information stored in the network configuration information storage (410).

The Profibus communication module (450) is connected to the Profibus, and performs a communication with the plurality of slave devices through the Profibus in response to control of the Profibus master state machine (440), and interfaces with predetermined information.

The master device thus configured according to the present disclosure determines whether the slave information collector (430) has stored the network configuration information in the network configuration information storage (410) while the power is turned on. Furthermore, the slave information collector (430) determines whether the network automatic configuration command is inputted from the configuration tool through the configuration tool communication module (400).

The slave information collector (430) requests the Profibus master state machine (440) information collection of the plurality of slave devices when the network configuration information storage (410) is not stored with the network configuration information, or when the network automatic configuration command is inputted.

The Profibus master state machine (440) performs a communication with the plurality of slave devices using the imaginary network configuration information stored kn the imaginary network configuration information storage (420) in response to the information collection request of the plurality of slave devices, receives configuration information of the plurality of slave devices and allows the slave information collector (430) to collect the received information.

Now, operation of collecting, by the slave information collector (430), the configuration information of the plurality of slave devices will be described in detail.

First, the Profibus master state machine (440) generates a diagnostic message and transmits the diagnostic message to the plurality of slave devices through the Profibus communication module (450) in order to search the plurality of slave devices connected to the Profibus.

The plurality of slave devices generates a response message and transmits the response message when the diagnostic message is received, and the Profibus master state machine (440) receives the response message through the Profibus communication module (450) and allows the slave information collector (430) to collect the received response message. Furthermore, the Profibus master state machine (440) generates a configuration information request message, and transmits the generated configuration information request message to a relevant plurality of slave devices of response message received by the slave information collector (430) through the Profibus communication module (450).

The plurality of slave devices having received the configuration information message transmits configuration information capable of automatically configuring the network, and the transmitted configuration information of the plurality of slave devices is received by the Profibus master state machine (440) through the Profibus communication module (450), and the received network configuration information is collected by the slave information collector (430).

While the slave information collector (430) collects the configuration information of the plurality of slave devices, the Profibus master state machine (440) stores the configuration information collected by the slave information collector (430) in the network configuration storage (410) as network configuration information in order to configure the network communication of the master device.

While the network configuration storage (410) is stored with the network configuration information, the Profibus master state machine (440) applies the network configuration information stored in the network configuration storage (410) in order to perform a communication with the plurality of slave devices formed with the network, and performs a communication with the plurality of slave devices through the Profibus communication module (450).

While the present disclosure may have been disclosed with respect to several exemplary embodiments, such features or aspects may be variably modified by those skilled in the art, provided they come within the scope of the appended claims. The above-mentioned master device of Profibus DP according to the present disclosure may, however, be embodied in many different forms and should not be construed as limited to the embodiments set forth herein. Thus, it is intended that embodiments of the present disclosure may cover the modifications and variations of this disclosure provided they come within the metes and bounds of the appended claims and their equivalents.

What is claimed is:

1. A master device of Profibus DP (Process Filed Bus Decentralized Periphery), the master device comprising:
    first storage in which imaginary network configuration information is pre-stored;
    second storage for storing network configuration information;
    a Profibus master state machine with circuitry for:
        transmitting a diagnosis message to a plurality of slave devices based on the imaginary network configuration information stored in the first storage in order to receive a response message;
        transmitting a configuration information request message to the plurality of slave devices after receiving the response message in order to receive the network configuration information;
        obtaining the network configuration information by performing communication with the plurality of slave devices based on the same imaginary network configuration information stored in the first storage that was used to transmit the diagnosis message;
        storing the obtained network configuration information in the second storage; and
        communicating with the plurality of slave devices based on the network configuration information stored in the second storage;
    a slave information collector for requesting network configuration information related to the plurality of slave devices from the Profibus master state machine and collecting the requested network configuration information when the network configuration information is not stored in the second storage; and
    a Profibus communication interface with circuitry for performing communication with the plurality of slave devices under control of the Profibus master state machine, wherein the Profibus master state machine obtains the network configuration information by performing communication with the plurality of slave devices when there is an information collection request from the slave information collector and provides the slave information collector with the obtained network configuration information and stores the obtained network configuration information in the second storage.

2. The master device of claim 1, wherein the slave information collector is further for:
determining whether the network configuration information is stored in the second storage and;
requesting the network configuration information related to the plurality of slave devices from the Profibus master state machine when the network configuration information is not stored in the second storage.

3. The master device of claim 1, further comprising a configuration tool communication module with circuitry for performing communication with a configuration tool,
wherein the slave information collector is further for requesting the Profibus master state machine to obtain the network configuration information related to the plurality of slave devices when a network auto configuration command is input from the configuration tool communication interface.

* * * * *